UNITED STATES PATENT OFFICE.

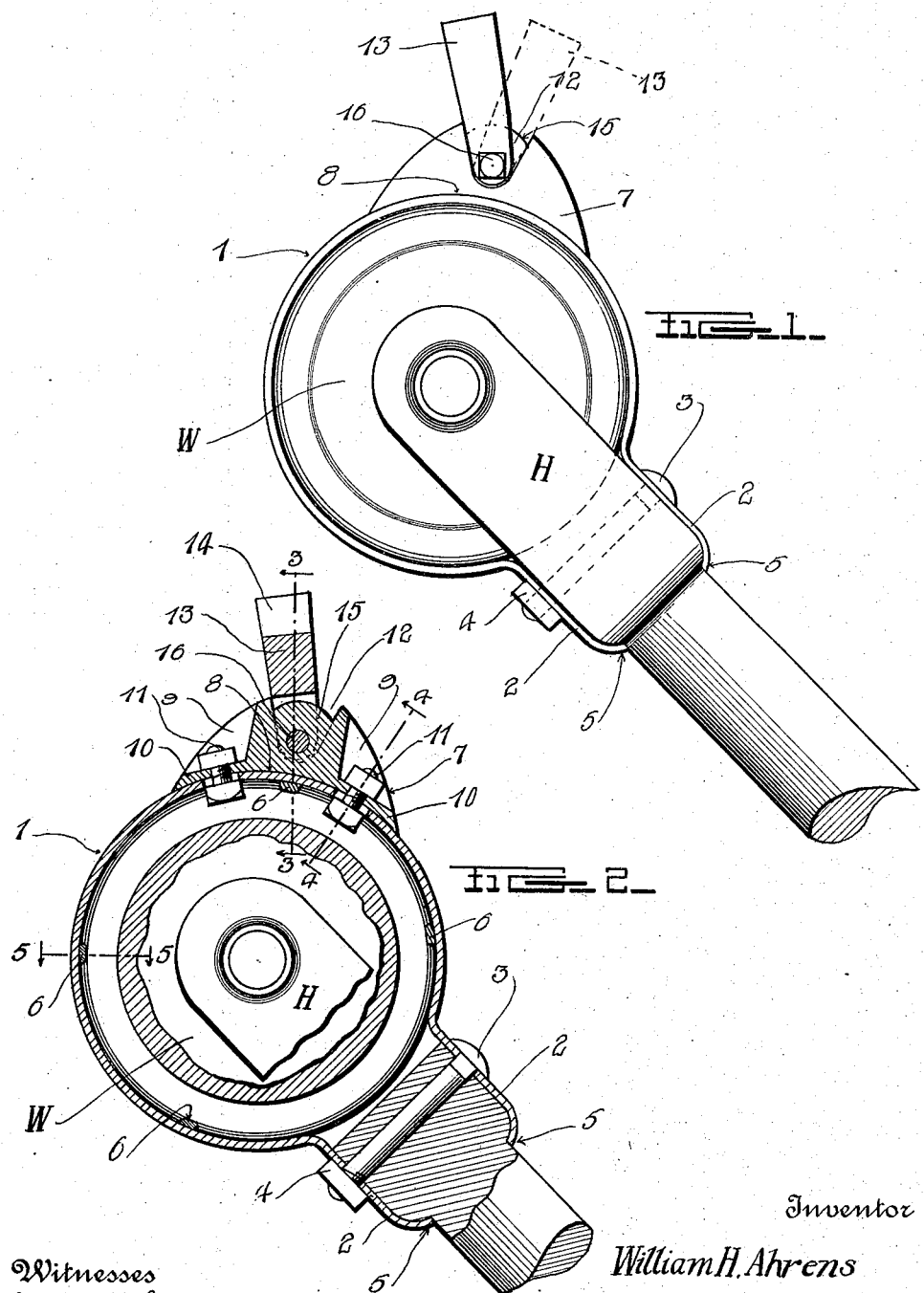

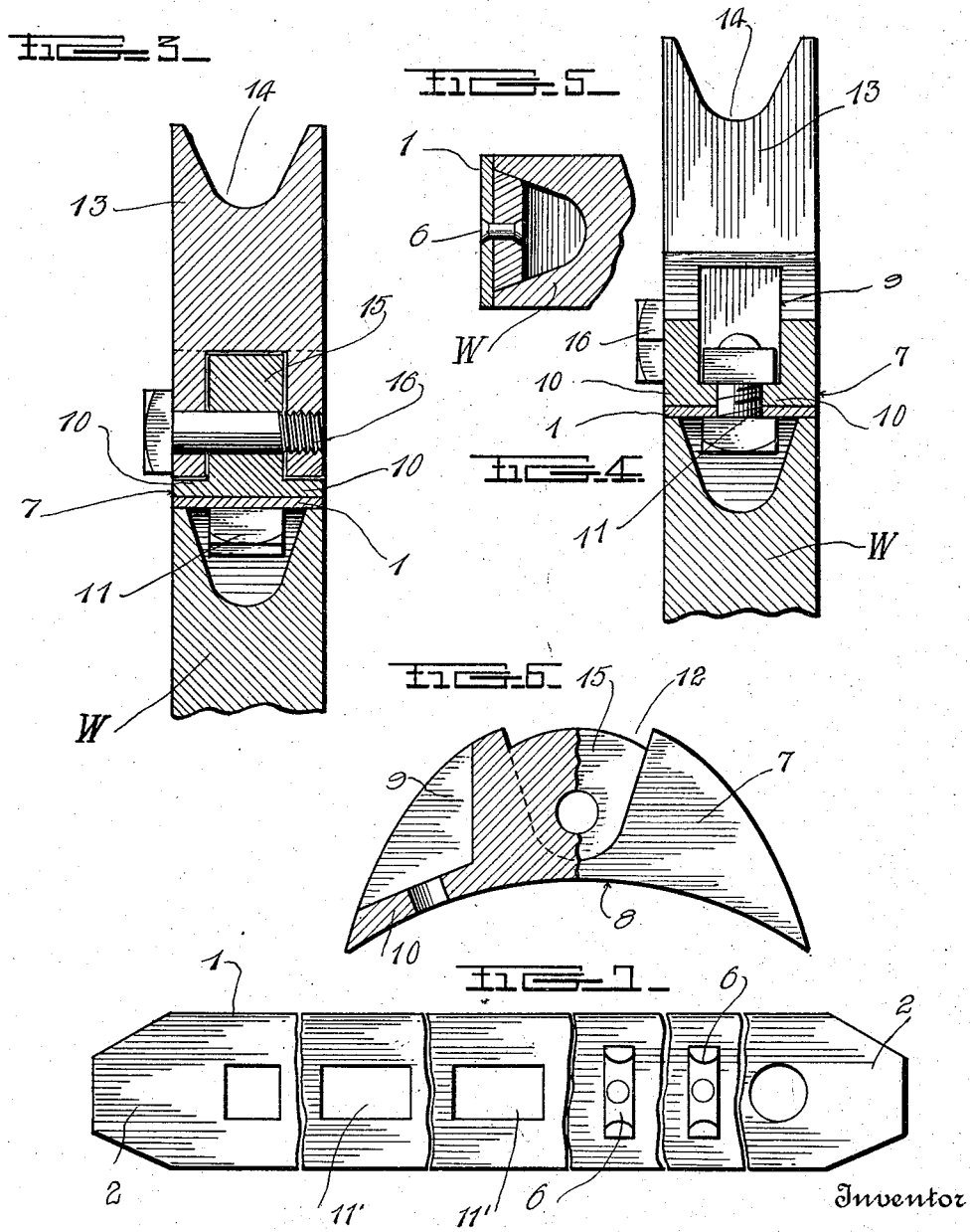

WILLIAM H. AHRENS, OF CANANDAIGUA, NEW YORK.

SLEET-SCRAPER FOR TROLLEY-WIRES.

1,191,140.  Specification of Letters Patent.  Patented July 18, 1916.

Application filed March 23, 1916. Serial No. 86,304.

*To all whom it may concern:*

Be it known that I, WILLIAM H. AHRENS, a citizen of the United States, residing at Canandaigua, in the county of Ontario and State of New York, have invented certain new and useful Improvements in Sleet-Scrapers for Trolley-Wires; and I do declare the following to be a full, clear, and exact description of the invention, such as will enable others skilled in the art to which it appertains to make and use the same.

This invention relates to improvements in trolley wire scrapers which are adapted to be applied to the trolley wheels of electric cars for the purpose of cleaning sleet and ice from the trolley wires.

The principal object of my invention is to provide a very simply constructed scraper which can be quickly and easily attached or detached from the trolley wheel and harp.

An additional object of the invention is to provide a simply constructed device of this character from which the scraper can be removed when worn and a new one attached in its place.

With the foregoing and many other objects in view my invention resides in the novel features of construction, combination and arrangement of parts which will hereinafter be more particularly described and claimed and shown in the drawings wherein:—

Figure 1 represents a side elevation of my improved sleet scraper applied to a trolley wheel; Fig. 2 is a central vertical section through the invention applied, parts of the wheel and harp being in section; Figs. 3, 4 and 5 are transverse sections taken respectively on the lines 3—3, 4—4 and 5—5 of Fig. 2; Fig. 6 is a detail side elevation of the scraper supporting block removed from the band and partly in section; Fig. 7 is a plan view of the band before being bent to encircle the trolley wheel, parts thereof being broken away.

This invention is adapted to be attached to the ordinary trolley wheel and the harp supporting the same, and comprises a resilient band 1 of spring metal flexible throughout its length, which, when in use encircles the trolley wheel W. The ends of the band 1 are extended radially therefrom to form attaching arms 2 which are apertured and disposed on opposite sides of the harp H, said harp being transversely apertured to receive a bolt 3 which also extends through the apertures in the arms 2, a thumb nut 4 being threaded on the end of said bolt to securely clamp the band upon the trolley wheel and harp. The free ends of the arms 2 are bent inwardly toward each other as shown at 5 and are adapted to grip the sides of the harp to aid in securing the band 1 against movement thereon, and also to avoid being caught in overhead work in case the trolley jumps off the wire.

As a further means for preventing lateral shifting of the band I provide the inwardly extending lugs 6 which are disposed at intervals around the inner surface of said band and extend into the groove in the trolley wheel W when the device is applied thereto. The lugs are either formed integrally with the resilient band 1 or otherwise secured thereto.

Secured to the band 1 on its outer surface is a scraper supporting block 7, the face thereof contacting with the band 1 being curved as shown at 8 to correspond to the curvature of the wheel W. The opposite end portions of the block 7 are recessed as at 9 to form attaching ears 10 through apertures in which bolts 11 are passed whereby to secure the same to the band 1. The material on each side of the recesses 9 forms reinforcing ribs which strengthen the attaching ears 10. The block is further recessed intermediate its ends as shown at 12, said recesses extending entirely across the block to receive the ice scraper 13 in the upper end of which is a groove 14 to receive the trolley wire. A rib 15 is disposed in the recess 12 and is provided with an aperture for receiving a bolt 16 which pivotally connects said scraper 13 to the block, said scraper having its lower end bifurcated and straddling the rib 15. By this arrangement the pivot bolt 16 can be readily removed when the scraper 13 becomes badly worn or burned out, and a new scraper substituted therefor. From the drawings it would seem that the pivoted scraper is limited in its movement by the end walls of the recess 12, the block 7 being so disposed upon the band 1 that the scraper will be active and contact with the wall of the recess 12, but when the car upon which the trolley wheel is mounted is moved backwardly the scraper will contact with the other wall. The openings in the band which receive the bolts 11 for attaching the block 7 thereto are preferably elongated as shown at 11' so that said block may be adjusted to various positions thereon.

I claim as my invention:

1. A device of the class described comprising a resilient band flexible throughout its length and adapted to encircle a trolley wheel, the ends of said band being extended radially therefrom to form attaching arms, said arms being apertured, an attaching element extending through said apertures to secure said band to the harp of the trolley, the free ends of the arms being bent inwardly from each other to grip the harp, and a sleet scraper carried by the band.

2. A device of the class described comprising a band adapted to encircle a trolley wheel, the free ends of said band being extended radially therefrom to form attaching arms, said arms being apertured, an attaching element extending through said apertures to secure said band to the harp of the trolley, lugs on the inner side of said band adapted to rest in the groove in said wheel, the ends of the lugs contacting with the flanges thereof, and a sleet scraper carried by the band.

3. A device of the class described comprising a resilient band flexible throughout its length and adapted to encircle a trolley wheel, the ends of said band being extended radially therefrom to form attaching arms, said arms being apertured, an attaching element extending through said apertures to secure said band to the harp of the trolley, the free ends of the arms being bent inwardly toward each other to grip the harp, lugs on the inner side of said band adapted to rest in the groove in said wheel, the ends of the lugs contacting with the flanges thereof, and a sleet scraper carried by the band.

4. In a device of the class described, a band adapted to encircle a trolley wheel, the ends of said band forming arms to be attached to the harp of a trolley, a block recessed at its opposite ends to provide attaching ears, said block being secured to the band by said ears, and an ice scraper attached to said block.

5. In a device of the class described, a band adapted to encircle a trolley wheel, the ends of said band forming arms to be attached to the harp of a trolley, a block recessed at its opposite ends to provide attaching ears, said block being secured to the band by said ears, and the intermediate portions of said block being also recessed, and an ice scraper pivoted in said last mentioned recess, its movement being limited by the walls thereof.

6. In a device of the class described, a band adapted to encircle a trolley wheel, the ends of said band forming arms to be attached to the harp of a trolley, a block recessed at its opposite ends to provide attaching ears, said block being secured to the band by said ears, and the intermediate portion of said block being also recessed, an apertured rib extending across said last mentioned recess, and an ice scraper having a pair of spaced apart arms straddling said rib and pivoted thereto, the movement of said scraper being limited by the walls of said recess.

In testimony whereof I have hereunto set my hand in presence of two subscribing witnesses.

WILLIAM H. AHRENS.

Witnesses:
P. F. LEECH,
L. W. VAN DEUSEN.

Copies of this patent may be obtained for five cents each, by addressing the "Commissioner of Patents, Washington, D. C."